United States Patent
Eigel et al.

(10) Patent No.: US 9,815,460 B2
(45) Date of Patent: Nov. 14, 2017

(54) METHOD AND DEVICE FOR SAFE PARKING OF A VEHICLE

(71) Applicant: VOLKSWAGEN AG, Wolfsburg (DE)

(72) Inventors: Thomas Eigel, Berlin (DE); Peter Mirwaldt, Braunschweig (DE); Bastian Schmidt, Hannover (DE)

(73) Assignee: VOLKSWAGEN AG (DE)

(*) Notice: Subject to any disclaimer, the term of this patent is extended or adjusted under 35 U.S.C. 154(b) by 0 days.

(21) Appl. No.: 15/092,059

(22) Filed: Apr. 6, 2016

(65) Prior Publication Data

US 2016/0297431 A1 Oct. 13, 2016

(30) Foreign Application Priority Data

Apr. 7, 2015 (DE) ...................... 10 2015 206 144.2

(51) Int. Cl.
*B60W 30/08* (2012.01)
*G08G 1/16* (2006.01)
(Continued)

(52) U.S. Cl.
CPC ............ *B60W 30/08* (2013.01); *B60W 30/06* (2013.01); *B60W 30/18109* (2013.01);
(Continued)

(58) Field of Classification Search
CPC .......... B60W 30/08; B60W 30/18109; B60W 30/06; B60W 40/09; B60W 2550/406;
(Continued)

(56) References Cited

U.S. PATENT DOCUMENTS

| | | | | |
|---|---|---|---|---|
| 7,202,776 B2 * | 4/2007 | Breed | ................. | B60N 2/2863 340/435 |
| 9,290,174 B1 * | 3/2016 | Zagorski | ............... | B60W 30/00 |
| 2012/0078509 A1 * | 3/2012 | Choi | ................. | G01C 21/3461 701/423 |
| 2014/0074338 A1 * | 3/2014 | Nordbruch | ........... | B60W 40/08 701/23 |
| 2014/0111369 A1 | 4/2014 | Oh et al. | | |
| 2015/0006012 A1 * | 1/2015 | Kammel | ............... | B60K 28/066 701/23 |
| 2015/0066284 A1 * | 3/2015 | Yopp | ..................... | B60W 30/00 701/29.2 |

(Continued)

FOREIGN PATENT DOCUMENTS

DE 102006039682 A1 2/2008
DE 102011086241 A1 5/2013
(Continued)

OTHER PUBLICATIONS

Search Report for German Patent Application No. 10 2015 206 144.2; dated Oct. 13, 2015.

*Primary Examiner* — Michael J Zanelli
(74) *Attorney, Agent, or Firm* — Barnes & Thornburg LLP

(57) ABSTRACT

A method and an apparatus for safely parking a vehicle, wherein after identifying an emergency situation of the motor vehicle, an emergency stopping position region is selected from a digital map, and the vehicle is parked within the emergency stopping position region by an automatic driving function. The method includes registering the surroundings, determining stationary objects and conditions in the vicinity of the vehicle within the selected emergency stopping position region, checking the conditions in the vicinity of the vehicle and the stationary objects within the emergency stopping position region regarding parking the vehicle in an optimized manner and determining an optimized emergency stopping position within the emergency stopping position region, and parking the vehicle at the optimized emergency stopping position within the emergency stopping position region using the automatic driving function.

9 Claims, 2 Drawing Sheets

(51) Int. Cl.
*B60W 30/06* (2006.01)
*B60W 40/09* (2012.01)
*B62D 15/02* (2006.01)
*B60W 30/18* (2012.01)
*B60W 40/08* (2012.01)

(52) U.S. Cl.
CPC ......... *B60W 40/09* (2013.01); *B62D 15/0285* (2013.01); *B60W 2040/0818* (2013.01); *B60W 2540/26* (2013.01); *B60W 2550/10* (2013.01); *B60W 2550/406* (2013.01); *B60W 2900/00* (2013.01)

(58) Field of Classification Search
CPC ..... B60W 2550/10; B60W 2040/0818; B60W 2540/26
See application file for complete search history.

(56) References Cited

U.S. PATENT DOCUMENTS

2015/0293534 A1* 10/2015 Takamatsu ............ B60W 30/00 701/28
2016/0137198 A1* 5/2016 Hauler .................. B60W 30/08 701/48

FOREIGN PATENT DOCUMENTS

| | | |
|---|---|---|
| DE | 102011089938 A1 | 6/2013 |
| DE | 102012008090 A1 | 10/2013 |
| DE | 112011105432 T5 | 4/2014 |
| DE | 102013213171 A1 | 1/2015 |
| DE | 102013016436 A1 | 4/2015 |
| JP | 2005-24507 * | 1/2005 |
| JP | 2007331652 A | 12/2007 |

* cited by examiner

METHOD AND DEVICE FOR SAFE PARKING OF A VEHICLE

PRIORITY CLAIM

This patent application claims priority to German Patent Application No. 10 2015 206 144.2, filed 7 Apr. 2015, the disclosure of which is incorporated herein by reference in its entirety.

SUMMARY

Illustrative embodiments relate to a method for safely parking a vehicle and a corresponding apparatus.

BACKGROUND

In the case of an emergency assistance system, when an emergency is identified, it is possible to automatically stop the vehicle, wherein the final positioning of the vehicle is performed in the simplest case where appropriate after changing lanes directly on the right-hand lane or, if a hard shoulder is present, on the hard shoulder. This positioning is not optimal in the normal case.

However, if the stopping position is selected on the basis of digital maps, the following situation occurs. The digital maps that are used in this case generally do not comprise the necessary level of detail for optimizing the vehicle position at the stopping position. If it is identified using only digital maps that by way of example a hard shoulder is not available, it is possible for the vehicle to be brought to a complete standstill in a traffic lane that is in use and then to represent a traffic obstruction.

Disclosed embodiments provide a method for optimizing the positioning of the vehicle when automatically stopping the vehicle in the event of the driver being unfit to drive.

BRIEF DESCRIPTION OF THE DRAWINGS

The disclosed embodiments will be explained in more detail with reference to the drawings, in which.

DETAILED DESCRIPTION OF THE DISCLOSED EMBODIMENTS

Figure 1:
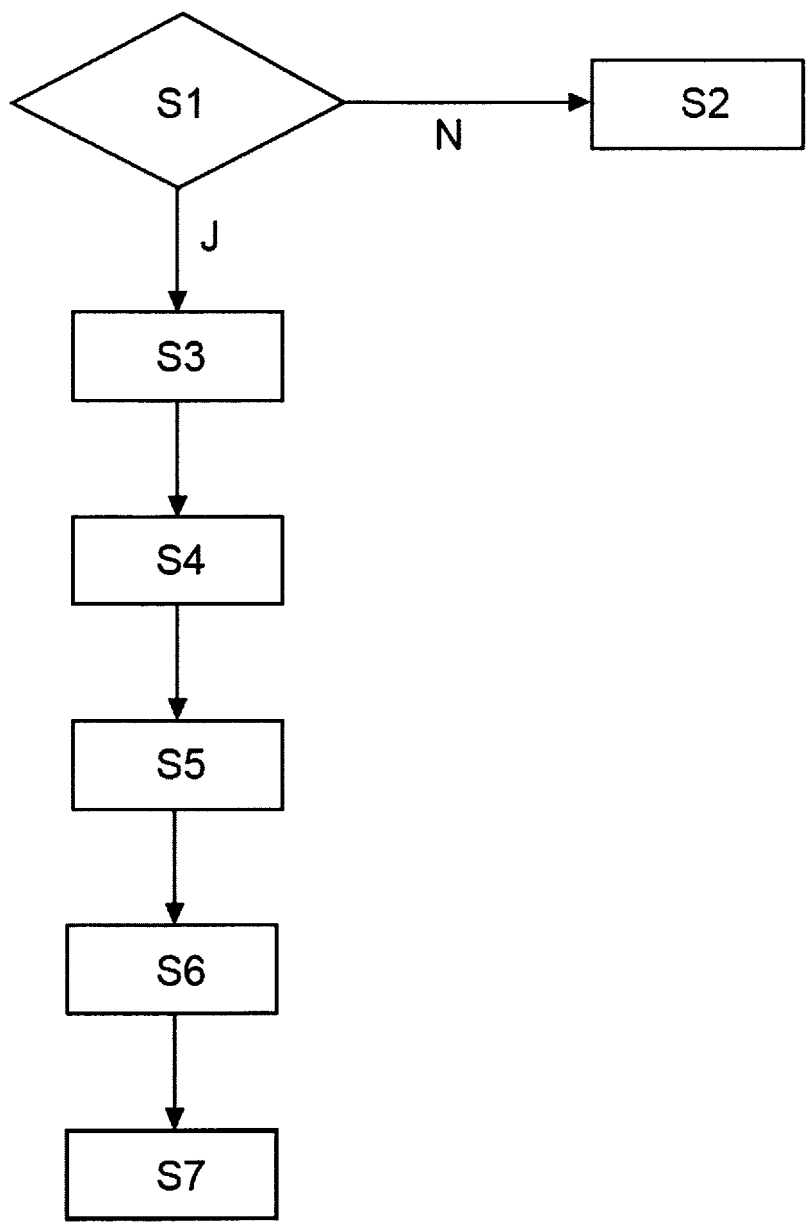
FIG. 1 illustrates schematically a flowchart of the disclosed method for safely parking a vehicle in an emergency situation.

Disclosed embodiments provide a method for safely parking a vehicle, wherein, after identifying an emergency situation of the motor vehicle, an emergency stopping position region is selected from a digital map and the vehicle is parked by an automatic driving function within the emergency stopping position region, the method performing the following steps to park the vehicle:

registering the surroundings,
determining stationary objects and conditions in the vicinity of the vehicle within the selected emergency stopping position region,
performing a check of the conditions in the vicinity of the vehicle and the stationary objects within the emergency stopping position region regarding parking the vehicle in an optimized manner and determining an optimized emergency stopping position within the emergency stopping position region, and
parking the vehicle at the optimized emergency stopping position within the emergency stopping position region using the automatic driving function.

During the stopping procedure, in the event of the driver being unfit to drive, an optimized positioning of the vehicle is determined by means of the emergency assistance using the surroundings sensor arrangement that is present in the vehicle for registering the surroundings when automatically stopping the vehicle within the emergency stopping position region that is drawn from the digital map. Since the digital map does not include any information or includes very little information regarding the prevailing conditions, such as surface quality and objects at the location of an emergency stopping position, it is only possible to select one region from the digital map, the emergency stopping position region, for stopping the vehicle. An emergency stopping position region of this type can be by way of example a highway parking lot, a visible region after a bend, a region having a hard shoulder, an entrance into a field etc. In particular, the emergency stopping position region can be of a predetermined size.

The optimized positioning of the vehicle occurs when taking into account the stationary objects, such as by way of example trees, shrubs, posts, crash barriers etc., and the conditions in the vicinity of the vehicle and the topography such as by way of example the type and drivability of the surface of the area surrounding the stopping position, ditches in the area surrounding the stopping position, gradients in the stopping position surface etc.

The optimized positioning can mean by way of example stopping between reflector posts, trees on the road edge or near the outer road marking if a hard shoulder that can be driven on is not available. The vehicle can also be positioned directly to the right-hand side of the road markings on the right-hand side of the road on the hard shoulder if the width of the hard shoulder cannot be clearly detected. The positioning of the vehicle is therefore optimized when automatically stopping the vehicle in the event of an emergency situation taking into account the direct surroundings of the stopping position.

Data from the surroundings sensor arrangement is taken into account to optimize the procedure of determining the emergency stopping position within the selected emergency stopping position region. For this purpose, initially a possible emergency stopping position region is selected from the digital map and subsequently when driving to the emergency stopping position region, an "optimized" emergency stopping position is determined in the sense that conditions in the vicinity of the vehicle, topography and stationary objects within the selected emergency stopping position region are taken into account. It is possible to safely park the vehicle in the event of an emergency situation since the conditions in the vicinity of the vehicle are taken into account.

The emergency situation can be identified in the event of the driver being unfit to drive, in other words in the event of the driver no longer being capable of performing his or her duties as a driver.

The check as to whether the conditions in the vicinity of the vehicle in the surrounding area of the selected stopping position and the stationary objects that are located therein render it possible to park the vehicle may comprise the check regarding the drivability of the hard shoulder and also the check as to whether sufficient space is available for the vehicle between roadside posts or between trees on the edge of the road. Parking the vehicle between roadside posts or between trees on the edge of the road has the benefit that the vehicle is safely parked at a position in which the vehicle does not impede the continuous traffic on the road or only does so to a negligible extent.

The conditions in the vicinity of the vehicle and the topography within the emergency stopping position region and the stationary objects that are located therein may be categorized and subsequently a check is performed as to whether the conditions in the vicinity of the vehicle and also the topography and the objects that are categorized render it possible to park the vehicle. Examples for the categorization are trees, crash barriers, roadside posts, road markings, hard shoulders, drainage ditches adjacent to the road and the like. It is possible by categorizing the objects and the conditions in the vicinity of the vehicle that the image of the surroundings and the images of the objects can be processed with as little as possible computing time since the image that is calculated only contains the categorized objects and further details of the surroundings or the objects are not taken into account.

Owing to the categorization procedure, the image processing can be performed in real time using available image processing algorithms.

In accordance with a further disclosed embodiment, the topography and also the drivability of the surface within the emergency stopping position region of the vehicle surroundings is determined from the information that is obtained from processing the image. The image processing is consequently also used for the purpose of determining further characteristics of the vehicle surroundings so that the image processing device is used effectively.

The disclosed apparatus, in other words the driver assistance system, for safely parking a vehicle in an emergency situation, the driver assistance system being configured and designed so as to implement the method that is described above comprises:
- a device for identifying an emergency situation,
- a navigation device having a digital map,
- a control device having an automatic driving function, wherein after identifying an emergency situation the control device determines from the digital map an emergency stopping position region for parking the vehicle and automatically drives the vehicle to the emergency stopping position region,
- a surroundings sensor arrangement for registering the surroundings of the vehicle,
- a device for determining conditions in the vicinity of the vehicle, topography and stationary objects within the emergency stopping position region from the information from the surroundings sensor arrangement, and
- a selecting device for selecting an optimized emergency stopping position within the emergency stopping position region as a function of the conditions in the vicinity of the vehicle, the topography and the objects that are stationary, wherein after identifying an emergency situation the control device parks the vehicle at the optimized emergency stopping position.

The surroundings sensor arrangement comprises one or multiple of the following devices: a radar device, a mono or stereo camera device, an ultrasonic sensor device to determine the distance with respect to the object in the vicinity, and a laser scanning device. In the case of this embodiment of the apparatus, components that are generally provided in the vehicle as standard are used to be able to implement the method.

Stationary objects may be categorized using image processing algorithms to determine the type of the stationary objects, and the distance of the stationary objects with respect to the vehicle and the distances of the stationary objects with respect to one another. Furthermore, conditions in the vicinity of the vehicle and surrounding the stopping position may be categorized using image processing algorithms to obtain information regarding the drivability of the surface of the stopping position surroundings. On the basis of the categorization, it is possible to maintain the computing time during the image processing procedure within acceptable limits by means of image processing algorithms that are available.

FIG. 1 illustrates schematically a flow diagram of the disclosed method for safely parking a vehicle in an emergency situation, wherein in the first step S1, a check is performed as to whether an emergency situation is occurring, in particular in the event of the driver being unfit to drive. If an emergency situation is not occurring, branch N is not followed and the vehicle continues with its journey that is illustrated with the step S2—Continue driving.

If an emergency situation is occurring, branch J is followed in step S1, an emergency stopping position region is determined in the next step S3 from a digital map that by way of example is present in a navigation system or is available by way of a telecommunications connection.

In the following step S4, the vehicle travels with the aid of an automatic driving function to the emergency stopping position region and in step S5, by means of detecting the surroundings of the vehicle by means of a surroundings sensor arrangement, the conditions in the vicinity of the vehicle, the topography and the stationary, in other words not moving, objects within the emergency stopping position region are determined, wherein the data from detecting the surroundings is processed and evaluated by way of example using an image processing algorithm.

In step S6, a check is performed as to where the conditions in the vicinity of the vehicle, the topography and the stationary objects render it possible to park the vehicle in an optimal manner and an optimized emergency parking position is determined within the emergency stopping position region. The check relates by way of example to the drivability of the hard shoulder and also by way of example to the check as to whether there is sufficient space available for the vehicle between roadside posts or between trees on the edge of the road.

For the purposes of this check, the conditions in the vicinity of the vehicle, topography and the stationary objects in step S6 are in addition categorized and an optimized emergency stopping position is then determined within the categorized surroundings of the vehicle and taking into account the categorized objects. The categorization of the stationary objects is by way of example performed using image processing algorithms to determine the type of stationary object, and to determine the distance of the stationary objects with respect to the vehicle and the distances of the stationary objects with respect to one another. In addition, the drivability of the surface surrounding the vehicle is determined from the information that is obtained by means of the image processing procedure.

In step S7, the vehicle is finally parked at the optimized emergency stopping position within the selected emergency stopping position region by the automatic driving function of the driver assistance system or emergency assistance system.

Figure 2:
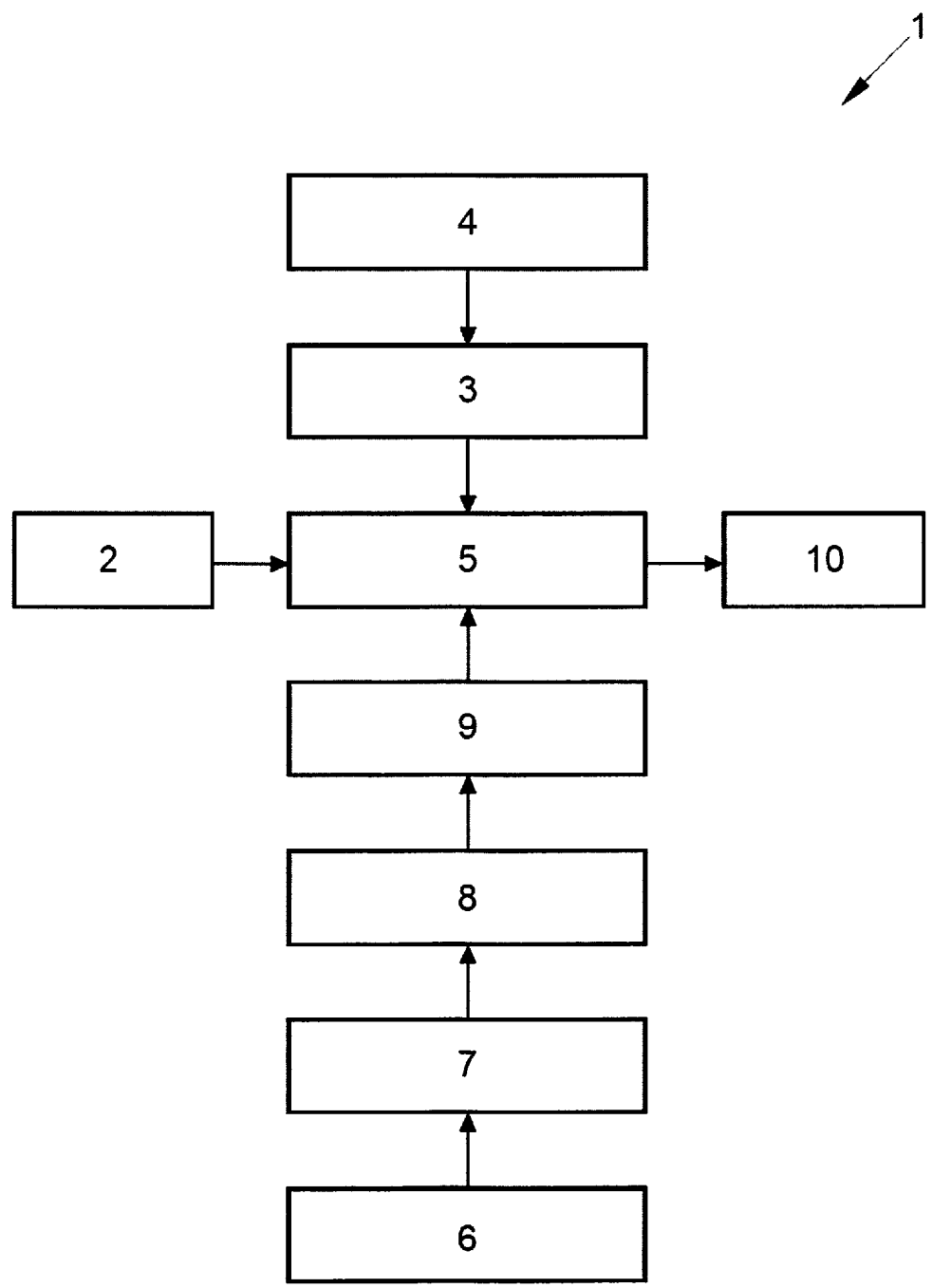
FIG. 2 illustrates schematically a block diagram of a disclosed apparatus for safely parking a vehicle in an emergency situation.

FIG. 2 illustrates schematically a block diagram of an apparatus, in other words a driver assistance system 1 or emergency assistance system, for safely parking a vehicle in an emergency situation. The apparatus comprises an emergency identifying device 2 that identifies an emergency situation, a navigation system 3 having a digital map 4 to be able to access map data, and a control device 5 having an automatic driving function that selects an emergency stopping position region from a digital map after identifying an emergency situation and the vehicle drives with the aid of the automatic driving function and also a vehicle controller 10 to the emergency stopping position region and parks the vehicle at that location at the emergency stopping position that is to be determined.

In addition, the vehicle driver assistance system 1 comprises a surroundings sensor arrangement 6 that is arranged on the vehicle for registering the surroundings of the vehicle. A device 7 for determining conditions in the vicinity of the vehicle, topography and stationary objects within the selected emergency stopping position region evaluates the data of the surroundings sensor arrangement 6 in this respect. The stationary objects, the topography and the conditions in the vicinity of the vehicle are categorized by means of a categorizing device 8 to determine the type of the stationary objects, the distance of the stationary objects with respect to the vehicle and the distances of the stationary objects with respect to one another. In addition, the conditions in the vicinity of the vehicle and the topography are investigated for their drivability. This can be performed by way of example using image algorithms or similar. Finally, a selecting device 9 selects an optimized emergency stopping position as a function of the categorized conditions in the vicinity of the vehicle, the topography and the objects within the emergency stopping position region so as to park the vehicle, wherein the control device 5 parks the vehicle using the automatic driving function under the control of the vehicle controller 10 at the emergency stopping position.

The surroundings sensor arrangement 6 can comprise one or multiple of the following devices: a radar device, a mono or stereo camera device, an ultrasonic device, to determine the distance with respect to the object in the vicinity, and a laser scanning device.

In the case of an emergency assistance system, when an emergency is identified, it is possible to automatically stop the vehicle, wherein the final positioning of the vehicle is performed in the simplest case where appropriate after changing lanes directly on the right-hand lane or, if a hard shoulder is present, on the hard shoulder. This positioning is not optimal in the normal case.

The publication DE 10 2011 086 241 A1 discloses a method for safely parking a vehicle in an emergency situation, wherein after identifying an emergency situation, a vehicle assistance system safely parks the vehicle and this requires information to be queried from an external data bank and taken into account by the driver assistance system. The data from a digital map of the road edge and/or information from the external data bank regarding the road edge are taken into account by the driver assistance system. So as to identify an emergency situation, a check is performed regarding the state of health, tiredness, whether or not the driver is distracted or intoxicated. A surrounding area of the vehicle is registered with the aid of sensors and is taken into account by the driver assistance system, wherein the surroundings are registered in the case of this method with reference to the traffic, in other words with reference to other vehicles in the area surrounding the vehicle that has the driver assistance system, to eliminate possible collisions or rear impact crashes. A suitable parking space or stopping position for the vehicle is selected from the digital map in the case of an emergency.

The publication DE 10 2012 008 090 A1 discloses a method for safely performing an emergency stopping maneuver of a moving motor vehicle by means of monitoring the driver of the motor vehicle so as to generate data relating to the state of the driver, to determine the level of the driving ability of the driver from the data relating to the state of the driver, to transfer the vehicle into an automatic driving mode if the grade of driving ability of the driver is below a predetermined threshold and to safely perform an emergency stopping maneuver. In addition, the method comprises determining from predictive road data of the stretch of road that lies ahead of the motor vehicle a stopping position that involves the minimum amount of risk for bringing the vehicle to an emergency stop, driving to the stopping position that involves the minimum amount of risk using the automatic driving mode and safely performing the emergency stopping maneuver in the stopping position that involves the minimum amount of risk. The predictive road data is determined from the position information and the map information from a navigation system. Hard shoulders that are visible, filtering in or filtering out lanes, intersection situations and/or tunnel situations are taken into account so as to determine the stopping position that involves the minimum amount of risk.

DE 11 2011 105 432 T5 discloses an apparatus that automatically stops a moving vehicle in the event of a driver-related emergency or maintains the stopped state of an already stopped vehicle. The stopping position is determined with reference to information from a vehicle navigation system.

However, if the stopping position is selected on the basis of digital maps, the following situation occurs. The digital maps that are used in this case generally do not comprise the necessary level of detail for optimizing the vehicle position at the stopping position. If it is identified using only digital maps that by way of example a hard shoulder is not available, it is possible for the vehicle to be brought to a complete standstill in a traffic lane that is in use and then to represent a traffic obstruction.

LIST OF REFERENCE NUMERALS

S1 Emergency situation? Y/N
S2 Continue driving
S3 Determine emergency stopping position region
S4 Travel to emergency stopping position region by means of the automatic driving function
S5 Determine conditions in the vicinity of the vehicle, topography and stationary objects in the emergency stopping position region by means of detecting the surroundings
S6 Determine optimized emergency stopping position within the emergency stopping position region
S7 Automatically park the vehicle at the emergency stopping position
1 Driver assistance system
2 Emergency identifying device for identifying an emergency situation
3 Navigation system
4 Digital map
5 Control device
6 Surroundings sensor arrangement
7 Device for determining conditions in the vicinity of the vehicle and stationary objects 8 Categorizing device
9 Selecting device
10 Vehicle controller

The invention claimed is:

1. A method for safely parking a vehicle, comprising:
after identifying an emergency situation relating to the driver of the vehicle, selecting an emergency stopping position region from a digital map; and
parking the vehicle within the emergency stopping position region by an automatic driving function, wherein the parking includes:
registering surroundings of the vehicle;
determining conditions in a vicinity of the vehicle, topography and stationary objects within the selected emergency stopping position region from the data obtained when registering the surroundings;
using the conditions in the vicinity of the vehicle, the topography and the stationary objects within the emergency stopping position region to determine an optimized emergency stopping position within the emergency stopping position region;
checking whether the conditions in the vicinity of the vehicle within the selected emergency stopping position region and the stationary objects that are located therein render it possible to park the vehicle, wherein the checking comprises, using image processing, checking drivability of a surface in the surrounding area of the emergency stopping position region and also checking whether sufficient space is available to park the vehicle in relation to the stationary objects; and
parking the vehicle at the optimized emergency stopping position within the emergency stopping position region using the automatic driving function.

2. The method of claim 1, wherein the emergency situation is that the driver being unfit to drive.

3. The method of claim 1, wherein the emergency stopping position region comprises a predetermined size.

4. The method of claim 1, further comprising categorizing the conditions in the vicinity of vehicle in the selected emergency stopping position region, the topography and the stationary objects that are located in the surroundings of the emergency stopping position region and subsequently checking for where the conditions in the vicinity of the vehicle, the topography and the categorized objects render it possible to park the vehicle.

5. The method of claim 4, wherein the stationary objects are categorized using image processing algorithms, to determine the type of the stationary objects, and the distance of the stationary objects with respect to the vehicle and the distances of the stationary objects with respect to one another.

6. The method of claim 1, wherein the conditions in the vicinity of the vehicle in the emergency stopping position region are categorized using image processing algorithms to obtain information regarding the drivability of the surface of the emergency stopping position region.

7. An apparatus for safely parking a vehicle in an emergency situation, the apparatus comprising:
a device for identifying an emergency situation relating to the driver;
a navigating device including a digital map;
a control device having an automatic driving function, wherein the control device determines an emergency stopping position region for parking the vehicle from a digital map after identifying an emergency situation and automatically drives the vehicle to the emergency stopping position region using the automatic driving function without driver instruction; and
a surroundings sensor arrangement for registering the surroundings of the vehicle,
wherein the control device determines and checks conditions in the vicinity of the vehicle, topography and stationary objects within the emergency stopping position region from the information from the surroundings sensor arrangement; and
an image processing device configured to check drivability of a surface in the surrounding area of the emergency stopping position region and also checking whether sufficient space is available to park the vehicle in relation to the stationary objects,
wherein the control device includes a selecting device for selecting an optimized emergency stopping position within the emergency stopping position region as a function of the conditions in the vicinity of the vehicle and the stationary objects within the emergency stopping position region, wherein the vehicle is parked at the emergency stopping position using the automatic driving function.

8. The apparatus of claim 7, wherein the surroundings sensor arrangement comprises one or multiple of the following devices: a radar device, a mono or stereo camera device, an ultrasonic device, to determine the distance with respect to an object in the vicinity of the vehicle, and a laser scanning device.

9. The apparatus of claim 7, comprising a categorizing device that categorizes the stationary objects and the conditions in the vicinity of the vehicle within the emergency stopping position region to determine the type of the stationary objects, the distance of the stationary objects with respect to the vehicle and the distances of the stationary objects with respect to one another, and examines the conditions in the vicinity of the vehicle and the topography are investigated regarding their drivability.

* * * * *